(12) United States Patent
Garang

(10) Patent No.: US 8,366,056 B2
(45) Date of Patent: Feb. 5, 2013

(54) WINGLET

(75) Inventor: Philippe Garang, Bristol (GB)

(73) Assignee: Airbus Operations Limited, Bristol (GB)

( * ) Notice: Subject to any disclaimer, the term of this patent is extended or adjusted under 35 U.S.C. 154(b) by 195 days.

(21) Appl. No.: 12/600,725

(22) PCT Filed: Jun. 10, 2008

(86) PCT No.: PCT/GB2008/050427
§ 371 (c)(1),
(2), (4) Date: Nov. 18, 2009

(87) PCT Pub. No.: WO2008/155566
PCT Pub. Date: Dec. 24, 2008

(65) Prior Publication Data
US 2010/0155541 A1 Jun. 24, 2010

(30) Foreign Application Priority Data
Jun. 21, 2007 (GB) .................. 0711942.3

(51) Int. Cl.
*B64C 23/06* (2006.01)
(52) U.S. Cl. .............. 244/199.4; 244/199.2; 244/45 R
(58) Field of Classification Search ............ 244/199.4, 244/45 R, 199.2, 198; D12/319, 345
See application file for complete search history.

(56) References Cited

U.S. PATENT DOCUMENTS

| | | | |
|---|---|---|---|
| 1,050,654 A | | 1/1913 | Holland |
| 2,576,981 A | | 12/1951 | Vogt |
| 3,504,873 A | * | 4/1970 | Spence ................. 244/45 R |
| 4,382,569 A | * | 5/1983 | Boppe et al. ............ 244/199.4 |
| 4,595,160 A | | 6/1986 | Santos |
| 4,674,709 A | * | 6/1987 | Welles ................. 244/45 R |
| 4,676,709 A | | 6/1987 | Bonora et al. |
| 4,714,215 A | | 12/1987 | Jupp et al. |
| 4,781,341 A | * | 11/1988 | Kasper .................. 244/199.4 |
| 5,102,068 A | * | 4/1992 | Gratzer ................. 244/199.4 |
| 5,275,358 A | | 1/1994 | Goldhammer et al. |

(Continued)

FOREIGN PATENT DOCUMENTS

EP 0525912 A1 2/1993
WO 2006030213 A1 3/2006

(Continued)

OTHER PUBLICATIONS

Mark D. Maughmer, "The Design of Winglets for High-Performance Sailplanes," The Pennsylvania State University, University Park, Pennsylvania, AIAA 2001-2406, pp. 1-12.

(Continued)

*Primary Examiner* — Michael Carone
*Assistant Examiner* — Steven Hawk
(74) *Attorney, Agent, or Firm* — Lowe, Hauptman, Ham & Berner, LLP

(57) ABSTRACT

A winglet comprising a root connected to a distal end of a wing; an upwardly angled section; a tip; and a transition between the upwardly angled section and the tip at which an outboard cant angle of the winglet decreases relative to a reference plane of the wing. In one embodiment the winglet is continuously curved and includes a point of inflection at which the span-wise curvature of the winglet changes sign. In another embodiment the upwardly angled section is planar. The winglet generates a tip vortex when in flight. The tip vortex is displaced outboard from the winglet due to the decrease in outboard cant angle at the transition.

13 Claims, 6 Drawing Sheets

U.S. PATENT DOCUMENTS

| | | | | |
|---|---|---|---|---|
| 5,348,253 A * | 9/1994 | Gratzer | ............ | 244/199.4 |
| 5,542,625 A * | 8/1996 | Burhans et al. | ............ | 244/45 R |
| 5,634,613 A * | 6/1997 | McCarthy | ............ | 244/199.2 |
| 6,474,604 B1 * | 11/2002 | Carlow | ............ | 244/198 |
| 6,484,968 B2 * | 11/2002 | Felker | ............ | 244/199.4 |
| 6,722,615 B2 | 4/2004 | Heller et al. | | |
| 7,246,998 B2 * | 7/2007 | Kovalsky et al. | ............ | 416/87 |
| 7,644,892 B1 * | 1/2010 | Alford et al. | ............ | 244/199.4 |
| 7,971,832 B2 * | 7/2011 | Hackett et al. | ............ | 244/199.4 |
| 2005/0281676 A1 * | 12/2005 | Egolf et al. | ............ | 416/228 |
| 2006/0104812 A1 * | 5/2006 | Kovalsky et al. | ............ | 416/87 |
| 2007/0252031 A1 * | 11/2007 | Hackett et al. | ............ | 244/199.4 |
| 2008/0223991 A1 * | 9/2008 | Mann | ............ | 244/199.4 |
| 2010/0181432 A1 * | 7/2010 | Gratzer | ............ | 244/199.4 |
| 2011/0024573 A1 * | 2/2011 | Kirk et al. | ............ | 244/199.4 |

FOREIGN PATENT DOCUMENTS

| | | | |
|---|---|---|---|
| WO | WO2006/030213 | * | 3/2006 |
| WO | 2007031732 A1 | | 3/2007 |

OTHER PUBLICATIONS

GB Search Report for GB0711942.3 dated Sep. 19, 2007.
ISR and WO for PCT/GB2008/050427 dated Oct. 30, 2008.

* cited by examiner

WINGLET

RELATED APPLICATIONS

The present application is a National Phase of PCT/GB2008/050427 filed Jun. 10, 2008, and claims priority from British Application Number 0711942.3 filed Jun. 21, 2007, the disclosures of which are hereby incorporated by reference herein in their entirety.

FIELD OF THE INVENTION

The present invention relates to a winglet.

BACKGROUND OF THE INVENTION

Increasing the wing span of an aircraft is a well known way to reduce induced drag (that is, drag produced due to the production of lift). However, civil aircraft wing spans are constrained by International Civil Aviation Authority rules which currently limit the wing span of a single aisle aircraft to 36 m.

Once the limit has been reached in the span-wise (y) direction then the curvilinear span of the wing can be increased by adding a vertical (z) component in the form of a winglet attached to the distal end of the wing.

A conventional winglet 1 is illustrated in FIG. 1. The winglet extends upwardly from a distal end of a wing 2. The winglet is planar and a reference plane 3 of the winglet lies at a constant cant angle. Note that the term "cant angle" is commonly defined in the literature as the angle between the winglet and a vertical line z, although in some cases (for example in U.S. Pat. No. 6,484,968) it is defined as the angle between the winglet and a reference plane of the wing. In this specification we use the latter definition—that is, we define the cant angle as the angle between the winglet and a reference plane of the wing when viewed perpendicular to a span-wise direction (y) of the winglet. We also define the terms "inboard cant angle" as the cant angle on the inboard side of the winglet and "outboard cant angle" as the cant angle on its outboard side. Thus the winglet 1 has an outboard cant angle $\phi$ and an inboard cant angle $\theta$.

The winglet 1 generates a tip vortex 5 when in flight. The tip vortex 5 interacts with a region 6 of the upper surface of the winglet. This interaction degrades the performance of the wing.

Another conventional winglet is described in U.S. Pat. No. 6,484,968. In this case the winglet follows an elliptical curve so that its outboard cant angle gradually increases towards the tip of the winglet.

A spiroid-tipped wing is described in U.S. Pat. No. 5,102,068. A spiroid tip device is connected to the wing and the ends of the spiroid are attached to the wing tip. Thus the outboard cant angle of the wing tip continuously increases.

SUMMARY OF THE INVENTION

The present invention provides a wing/winglet combination comprising a wing having a distal end and a reference plane; and a winglet comprising a root connected to the distal end of the wing, an upwardly angled section, a tip positioned above the reference plane of the wing, and a transition between the upwardly angled section and the tip at which an outboard cant angle of the winglet decreases relative to the reference plane of the wing.

In one embodiment at least part of the winglet is continuously curved and includes a point of inflection at which the span-wise curvature of the winglet changes sign. Preferably the outboard cant angle of the winglet decreases continuously through the transition. In another embodiment the upwardly angled section is planar with a substantially constant cant angle.

Typically the outboard cant angle of the winglet at the tip is lower than the average outboard cant angle of the winglet. Preferably the outboard cant angle of the winglet is less than 20 degrees at the tip, and may be close to zero or negative.

Preferably the span-wise curvature of the winglet reaches a maximum at the transition. This provides a sharp decrease in outboard cant angle.

Preferably the winglet has a distal section between the transition and the tip, and the distal section makes an angle of 90 degrees (+/−15 degrees) with the upwardly angled section of the winglet, when viewed perpendicular to a span-wise direction of the winglet. An angle of 90 degrees maximises the displacement of the tip vortex in an outboard direction away from the upwardly angled section of the winglet.

In one embodiment the winglet has a continuously curved leading edge and a continuously curved trailing edge. In another embodiment the leading and trailing edges of the winglet have a pair of straight portions separated by a curved transition.

Preferably the winglet is swept back relative to the wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
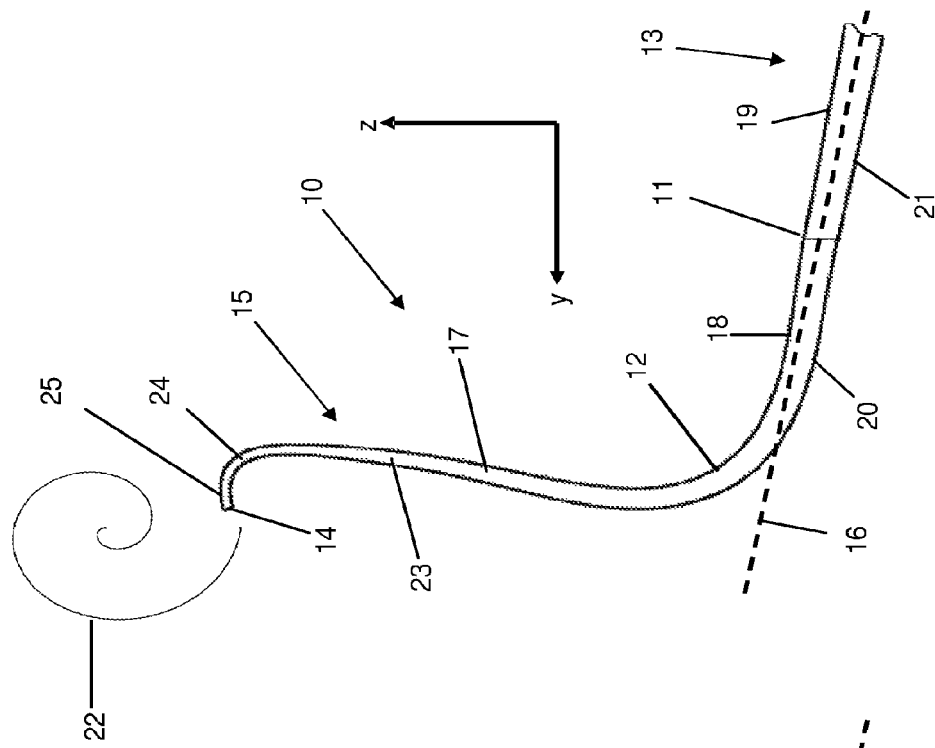
FIG. 2 is a front elevational view of a winglet according to a first embodiment of the invention, viewed perpendicular to a span-wise direction of the winglet.
Figure 1:
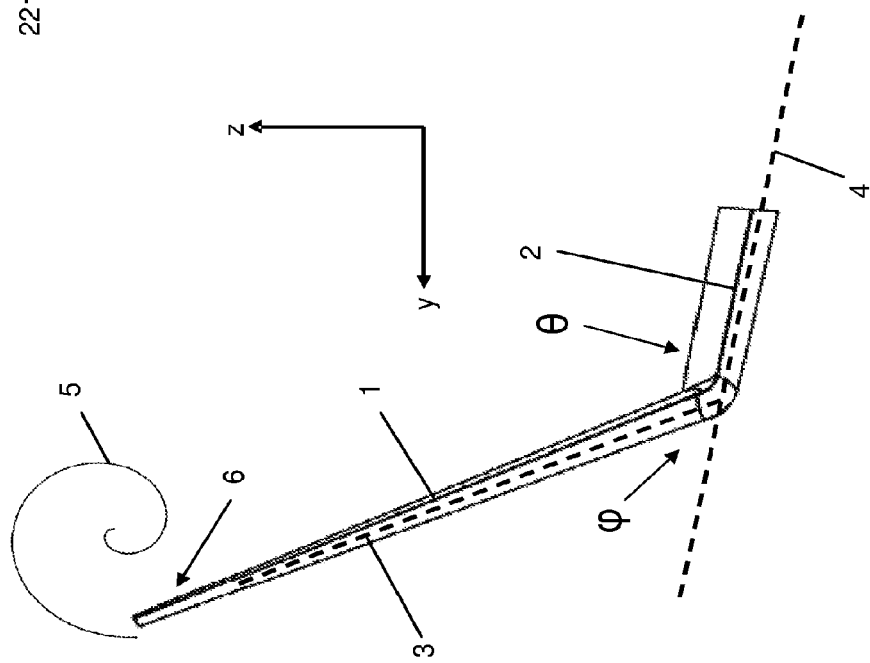
FIG. 1 is a front elevational view of a conventional winglet, viewed perpendicular to a span-wise direction of the winglet.

A winglet 10 according to a first embodiment of the invention is illustrated in FIG. 2. The winglet comprising a root 11 connected to a distal end of a wing 13; a tip 14; an upwardly angled section 12; and a gradual transition 15 between the section 12 and the tip 14. The outboard cant angle of the winglet (that is, the outboard angle of the winglet relative to the reference plane 16 of the wing) decreases through the transition 15.

The winglet 10 has an upper surface 18 which is a continuation of an upper surface 19 of the wing 13 and a lower surface 20 which is a continuation of a lower surface 21 of the wing.

The winglet 10 is continuously curved. The outboard cant angle increases through the upwardly angled section 12 up to a point of inflection 17 at which the outboard cant angle reaches a maximum, and the span-wise curvature changes sign. The outboard cant angle then decreases continuously through the transition 15 between the point of inflection 17 and the tip 14. The transition 15 includes a section 23 with relatively low span-wise curvature, and a section 24, near to the tip 14, where the span-wise curvature of the winglet reaches a maximum. A section 25 between the section 24 and the tip 14 has relatively low curvature and an outboard cant angle which is close to zero (or slightly negative).

The winglet 10 generates a tip vortex 22 when in flight. The tip vortex 22 is displaced outboard from the winglet due to the sharp change of outboard cant angle at the section 24. Note that the angle between the section 25 and the section 23 is approximately 90 degrees (+/−15 degrees) so as to maximises the displacement of the tip vortex in an outboard direction away from the upwardly angled sections 12,23.

Figure 3:
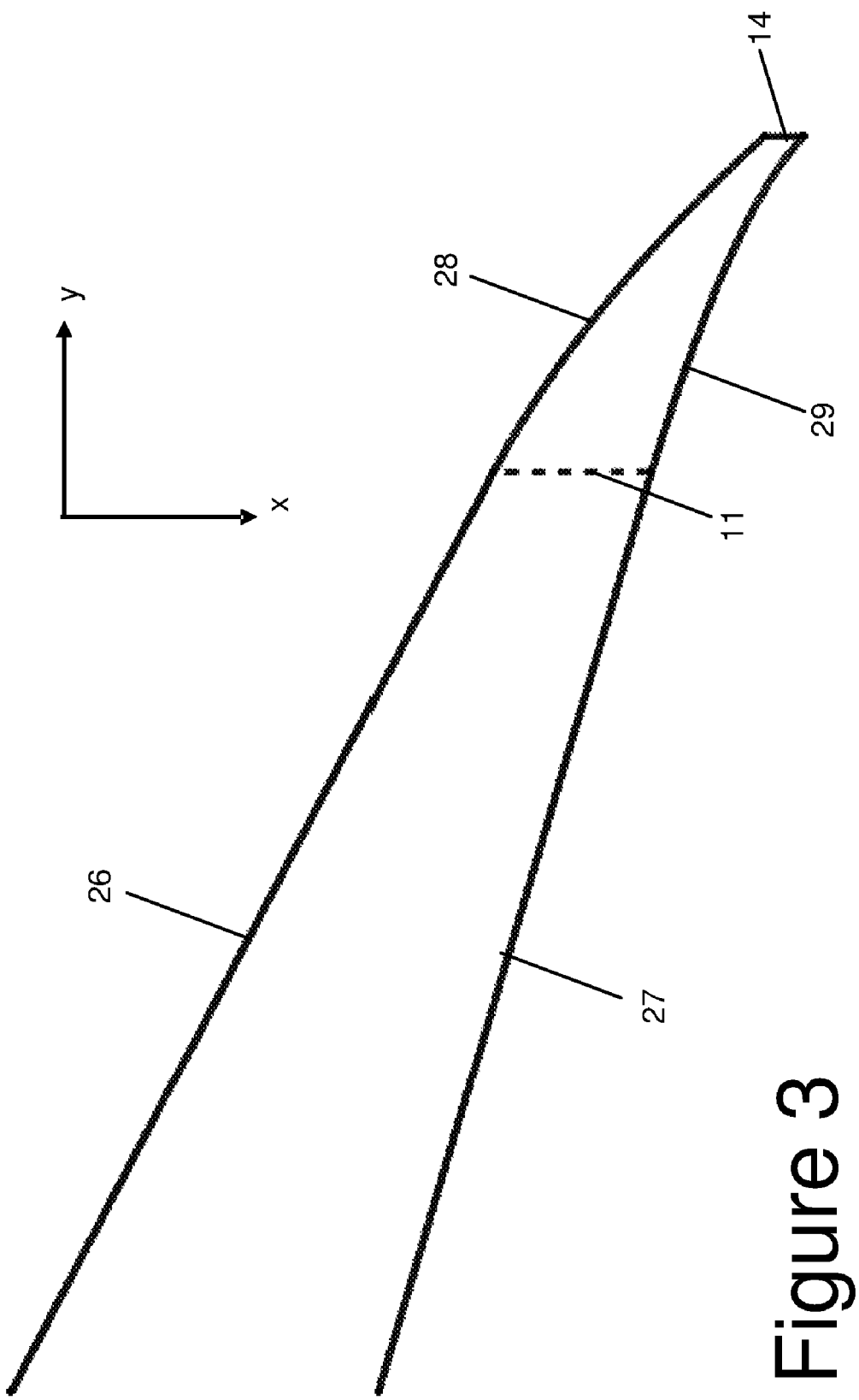
FIG. 3 is a deployed plan view of the winglet of FIG. 2.

As shown in the plan view of FIG. 3, the wing is swept back and has a straight leading edge 26 and a straight trailing edge 27. The winglet is swept back relative to the wing and has a continuously curved leading edge 28 and a continuously curved trailing edge 29. The curves in these leading and trailing edges 28,29 provide a smooth span-wise loading distribution for the winglet.

The S-shape of the winglet 10 enables a much longer trailing edge length to be fitted into a given span limit. Also, within a given span limit, the S-shape of the winglet provides a large curvilinear length projected in the yz plane, and thus low induced drag within a given set of constraints.

As shown in FIG. 3, the winglet 10 is highly tapered when viewed in a deployed plan view. Note that a deployed plan view is a view of the winglet as it would appear from above if it was flattened from its S-shape to a planar shape. The tapered form moves the centre of pressure of the winglet inboard and thus limits its impact on the bending moment. A taper range of [0.13; 0.35] is preferred. A highly tapered winglet also helps to comply with sweep criteria and also reduces the winglet area, thus leading to a lower impact on profile drag for a given curvilinear deployed span.

A moderate to high amount of sweep has two purposes. First it avoids wave drag on the winglet and at the junction with the wing. Secondly it tends to reduce slightly the wing bending moment. The leading edge averaged sweep line should not exceed 65 deg measured from the y axis. The suggested sweep interval is [30 deg; 65 deg].

For drag reduction a large winglet height is preferred, but the weight must not be too great for structural reasons. A suitable compromise between these requirements can be found by making the height of the winglet projected into the xz plane between 1.25% and 10% of the vertical length of the wing projected into the yz plane.

The ratio between the maximum thickness of the winglet relative to its local chord as you move along the span is preferably in the range [8%; 12.5%], ideally towards the lower end of the range to ensure low drag penalties.

Figure 4:
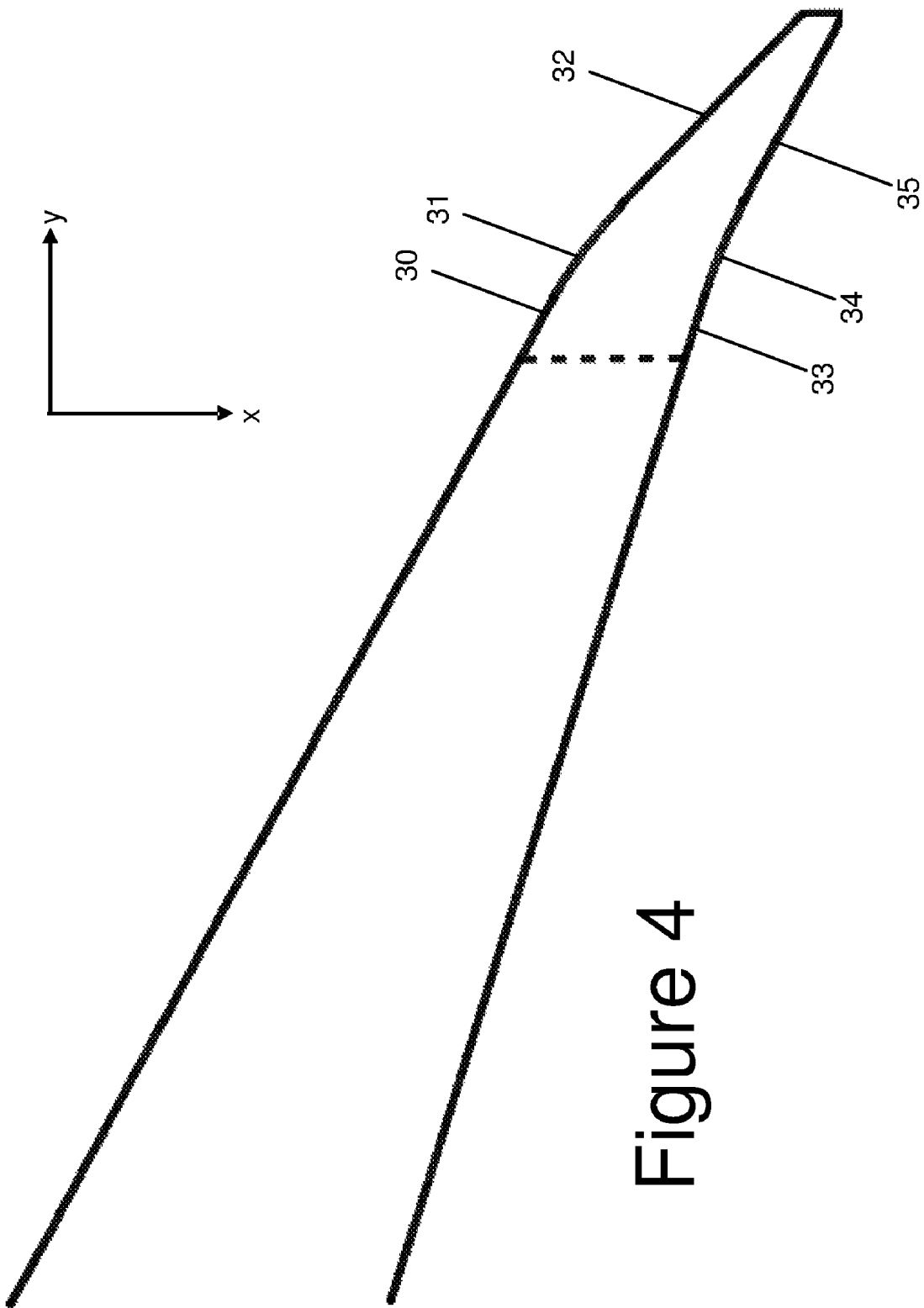
FIG. 4 is an alternative deployed plan view for the winglet of FIG. 2.
Figure 6:
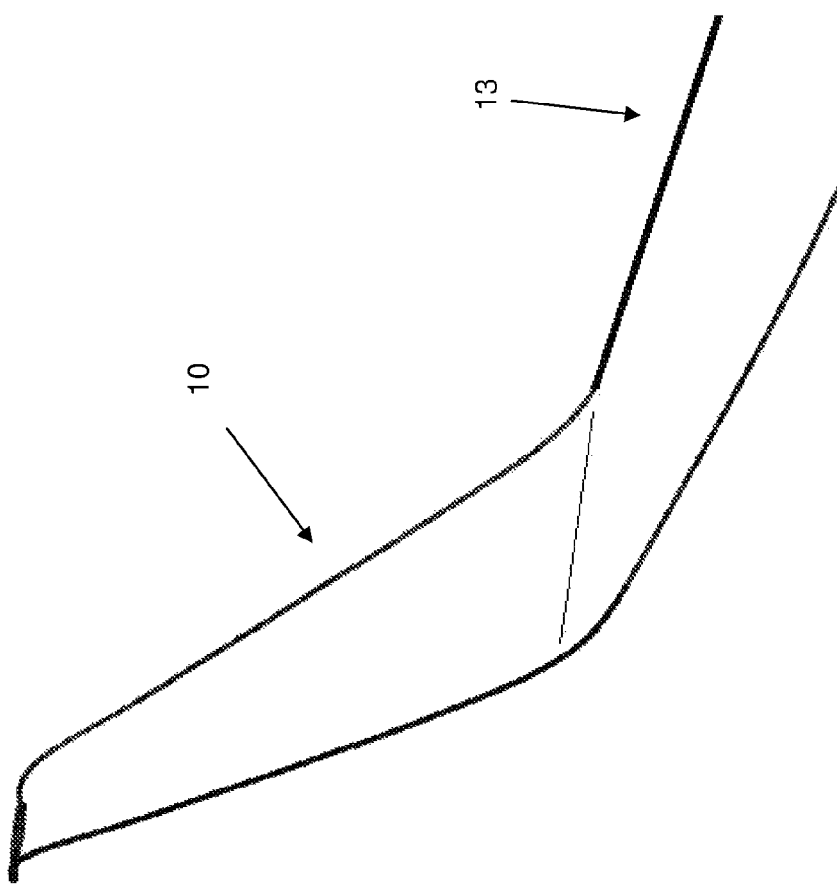
FIGS. 5-7 are perspective views of the winglet of FIG. 2.
Figure 5:
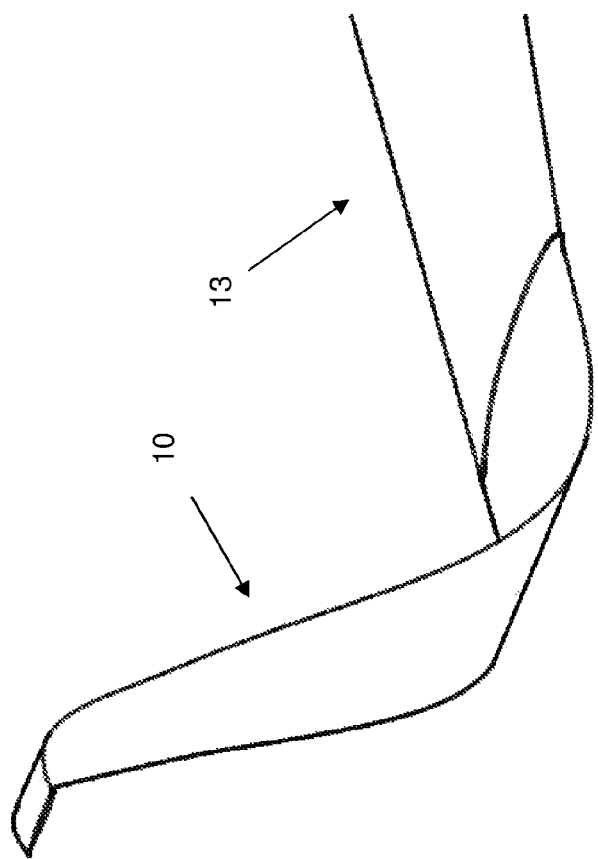
Figure 7:
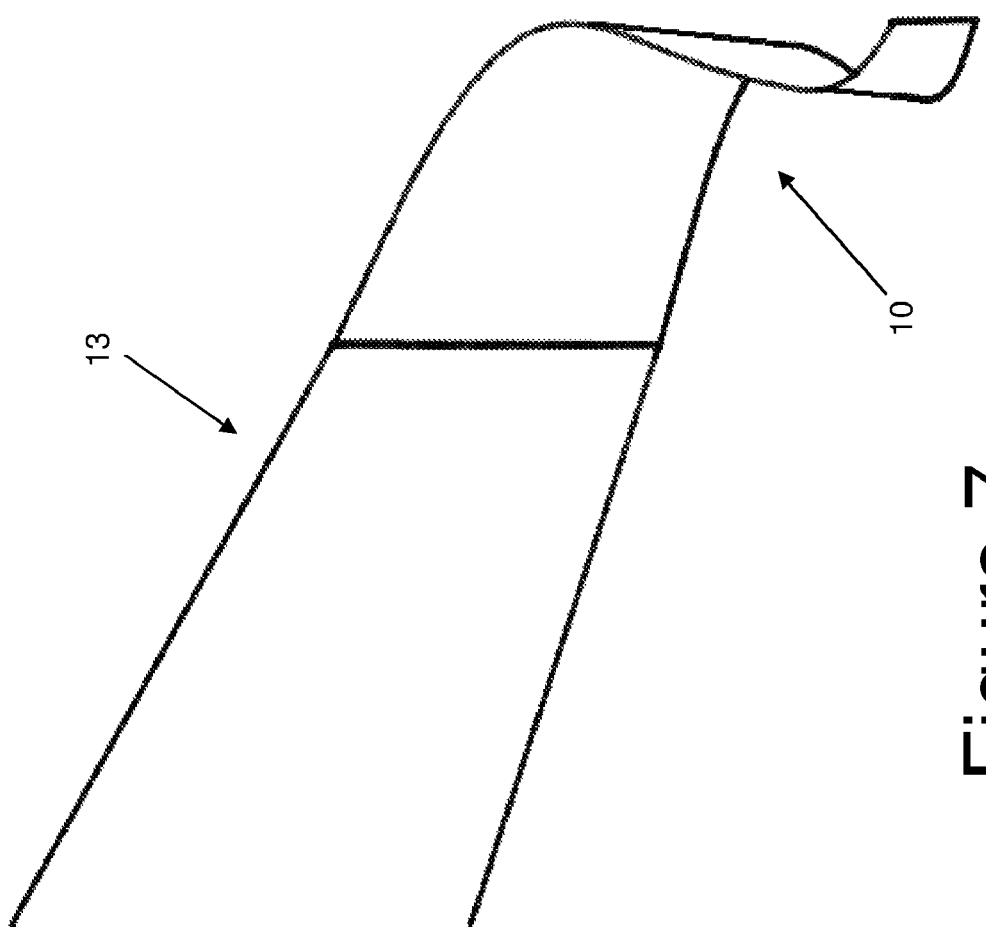

An alternative deployed planform winglet profile is shown in FIG. 4. In this case the winglet has a leading edge with a pair of straight portions 30,32 separated by a curved transition 31; and a trailing edge with a pair of straight portions 33,35 separated by a curved transition 34.

Figure 8:
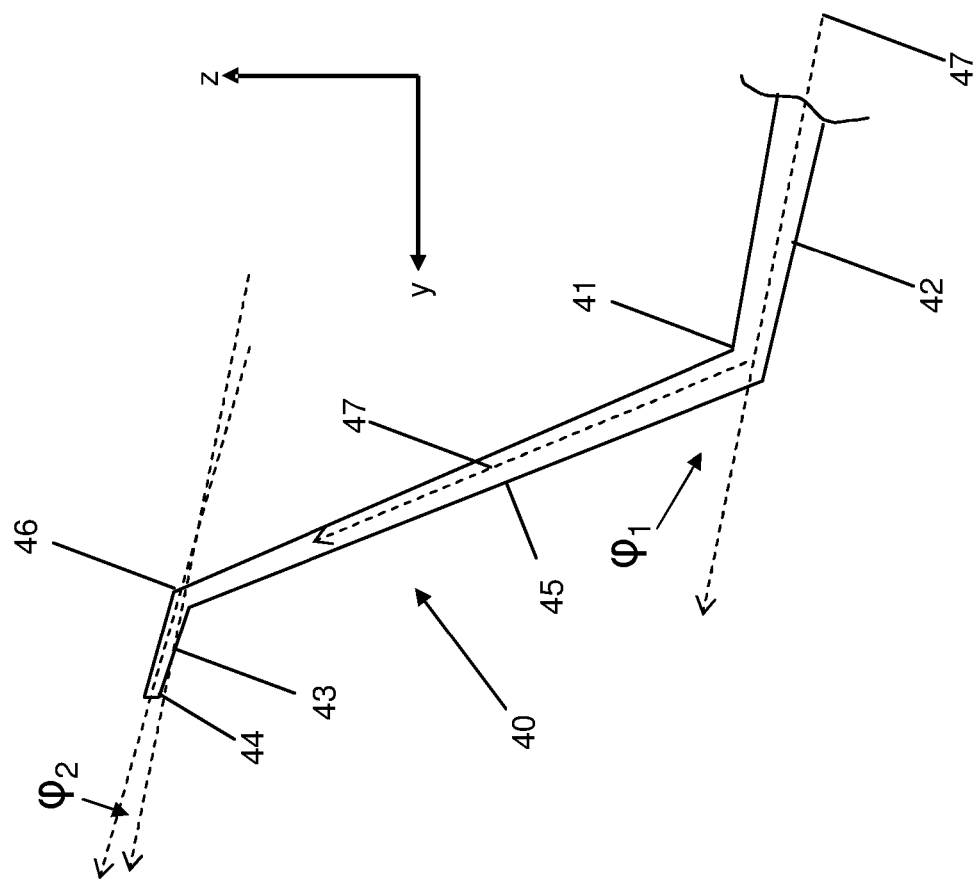
FIG. 8 is a front elevational view of a winglet according to a second embodiment of the invention, viewed perpendicular to a span-wise direction of the winglet.

A winglet 40 according to a second embodiment of the invention is illustrated in FIG. 8. The winglet comprises a root 41 connected to a distal end of a wing 42; a distal section 43 with a tip 44 and a relatively low outboard cant angle $\phi_2$ relative to a reference plane 47 of the wing; an upwardly angled proximal section 45 with a relatively high outboard cant angle $\phi_1$ relative to the reference plane 47 of the wing; and a sharp transition 46 between the proximal section 45 and the distal section 44 at which the outboard cant angle of the winglet decreases.

In contrast with the continuously curved winglet 10, the sections 43,44 are planar. The transition 46 is shown as a sharp corner, but in practice may be curved slightly. The winglet 40 generates a tip vortex when in flight. The tip vortex is displaced outboard from the proximal section 45 of the winglet due to the sharp change of cant angle at the transition 46.

Figure 9:
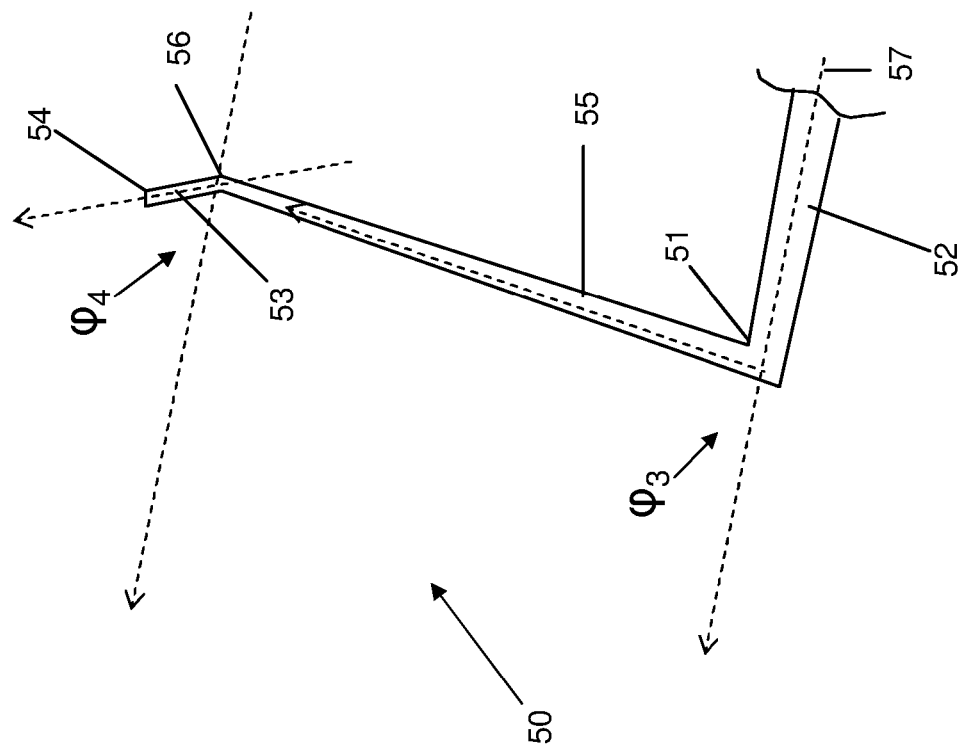
FIG. 9 is a front elevational view of a winglet according to a third embodiment of the invention, viewed perpendicular to a span-wise direction of the winglet.

A winglet 50 according to a third embodiment of the invention is illustrated in FIG. 9. The winglet comprises a root 51 connected to a distal end of a wing 52; a distal section 53 with a tip 54 and a relatively low outboard cant angle $\phi_4$ relative to a reference plane 57 of the wing; an upwardly angled proximal section 55 with a relatively high outboard cant angle $\phi_3$ relative to a reference plane 57 of the wing; and a transition 56 between the proximal section 55 and the distal section 54 at which the outboard cant angle of the winglet decreases abruptly. Note that in the case of FIG. 9 the outboard cant angle $\phi_3$ of the proximal section is greater than 90 degrees.

Although the invention has been described above with reference to one or more preferred embodiments, it will be appreciated that various changes or modifications may be made without departing from the scope of the invention as defined in the appended claims.

The invention claimed is:

1. A wing/winglet combination comprising a wing having a distal end and a reference plane; and a winglet comprising a root connected to the distal end of the wing, an upwardly angled section, a tip positioned above the reference plane of the wings, and a transition between the upwardly angled section and the tip at which an outboard cant angle of the winglet decreases relative to the reference plane of the wing, wherein the outboard cant angle at the tip is at least 0 degrees.

2. The wing/winglet combination of claim 1 wherein at least part of the winglet is continuously curved and includes a point of inflection at which the span-wise curvature of the winglet changes sign.

3. The wing/winglet combination of claim 2 wherein the outboard cant angle of the winglet decreases continuously through the transition.

4. The wing/winglet combination of claim 1 wherein the winglet has a distal section between the transition and the tip, and wherein the distal section makes an angle of 90 degrees (+/−15 degrees) with the upwardly angled section of the winglet, when viewed perpendicular to a span-wise direction of the winglet.

5. The wing/winglet combination of claim 1 wherein the outboard cant angle decreases by 90 degrees (+/−15 degrees) through the transition.

6. The wing/winglet combination of claim 1 wherein the outboard cant angle of the winglet is less than 20 degrees at the tip.

7. The wing/winglet combination of claim 1 wherein the outboard cant angle of the winglet at the tip is lower than the average outboard cant angle of the winglet.

8. The wing/winglet combination of claim 1 wherein the span-wise curvature of the winglet reaches a maximum at the transition.

9. The wing/winglet combination of claim 1 wherein the winglet has a continuously curved leading edge and a continuously curved trailing edge.

10. The wing/winglet combination of claim 1 wherein the winglet is swept back relative to the wing.

11. A wing/winglet combination comprising a wing having a distal end and a reference plane; and a winglet comprising a root connected to the distal end of the wing, an upwardly angled section, a tip positioned above the reference plane of the wing, and a transition between the upwardly angled section and the tip at which an outboard cant angle of the winglet decreases relative to the reference plane of the wing, wherein the spanwise curvature of the winglet reaches a maximum at the transition and decreases between the transition and the tip.

12. A wing/winglet combination comprising a wing having a distal end and a reference plane; and a winglet comprising a root connected to the distal end of the wing, an upwardly angled section, a tip positioned above the reference plane of the wing, and a transition between the upwardly angled section and the tip at which an outboard cant angle of the winglet decreases relative to the reference plane of the wing, wherein a distance between the root and the tip in a spanwise direction of the reference plane is less than a distance between the root and the tip in a height direction perpendicular to the reference plane.

13. A wing/winglet combination comprising a wing having a distal end and a reference plane; and a winglet comprising a root connected to the distal end of the wing, an upwardly angled section, a tip positioned above the reference plane of the wing, and a transition between the upwardly angled section and the tip at which an outboard cant angle of the winglet decreases relative to the reference plane of the wing, wherein the upwardly angled section has a substantially constant cant angle.

* * * * *